Patented Aug. 4, 1942

2,292,021

UNITED STATES PATENT OFFICE 2,292,021

MANUFACTURE OF CYANINE DYESTUFFS

Robert Walter, Wolfen, Kreis Bitterfeld, Germany, and Hermann Dürr, Binghamton, N. Y., assignors, by mesne assignments, to General Aniline & Film Corporation, New York, N. Y., a corporation of Delaware No Drawing. Application July 6, 1933, Serial No. 679,264. In Germany July 13, 1932

14 Claims. (Cl. 260—240)

Our present invention relates to the manufacture of cyanine dyestuffs.

One of its objects is to provide a process for producing cyanine dyestuffs and more particularly of cyanines, pseudocyanines and isocyanines. Further objects will be seen from the detailed specification following hereafter.

We have found that it is possible to prepare cyanine dyestuffs, more particularly cyanines, pseudo- and isocyanines, by condensing a heterocyclic base which in α-position to the nitrogen contains a reactive bivalent poly-atomic grouping and corresponding with the general formula

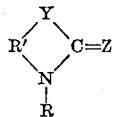

with a quaternary ammonium salt of heterocyclic bases having a reactive methyl group and corresponding with the following general formula

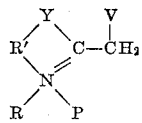

in both formulae
R stands for alkyl
R' stands for vinylene, phenylene, naphthylene or another polynuclear ring system,
Y stands for the group

(wherein $R_1$ and $R_2$ stand for aryl or alkyl), vinylene, oxygen, sulfur or selenium,
P stands for Cl, Br, I, $SO_4R$, $ClO_4$ or another anion, and
V stands for hydrogen, alkyl or aryl.
In Formula 1
Z stands for the groups

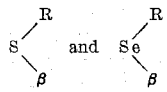

(wherein β stands for halogen or $SO_4R$,) =N—NO, =$NC_6H_5$ or another reactive bivalent atom grouping.

Where the compounds of Formula 1 have in α-position to the N-atom, a side chain containing sulfur or selenium, said compounds may be equally well represented as a salt consisting of an acid radical and a radical of the formula

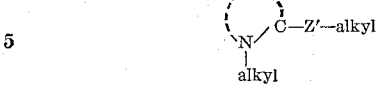

in which case Z' is S or Se, and X is the remainder of a heterocyclic system of the type used in cyanine dyes, for instance, the residue of the system

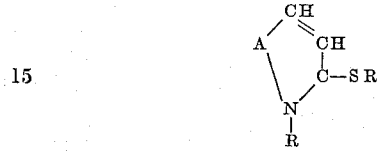

wherein A is phenylene.

In Formula 2 the reactive methyl group may also stand in para-position to the nitrogen in the case of the bases derived from pyridine. Furthermore there may be used the pseudo bases resulting from the quaternary ammonium salts by splitting off hydrogen halide.

The reaction is carried out in presence of condensation agents or solvents. Such agents are the pyridine bases mixtures of pyridine bases, for instance, pyridine and piperidine, alcohol and piperidine, monoethylamine and other strong organic bases, and sodium ethylate.

The yield obtained by the present process, particularly in case of thiocyanine dyestuffs is far superior to that obtained by the process according to Mills and Braunholtz (cf. Journ. Chem. Soc. London, 123, 2804—13, C.1924/I.1383). Moreover the dyes are obtained in a very pure form. They may be crystallized directly from the reaction mixture without by-products, or they may be precipitated by means of water.

When using, for instance, an alkyl iodide of the N-alkylthiobenzothiazolones and selenobenzthiazolones respectively, the condensation with the alkyl iodide of a heterocyclic base containing a reactive methyl group takes place under separation of alkyl mercaptan or alkylselenomercaptan and hydrogen iodide.

The nitrosoimido group reacts with the reactive methyl group of the heterocyclic bases under separation of nitrogen and water.

The cyanine dyestuffs prepared according to this invention are applicable for sensitizing photographic silver halide emulsions. The sensitizing may be effected in the manner well known in the art.

The following examples illustrate the invention:

EXAMPLE 1. — *[3 - ethyl - benzthiazole - (2)]-[3-methyl - benzthiazole - (2)] - methinecyanine iodide*

30 grams of N-methylthiobenzothiazolone-methyl-iodide (1 molecular proportion) are gradually run in a boiling solution of 30 grams of 2-methylbenzothiazole-ethiodide (more than 1 molecular proportion) and 150 cc. of pyridine and boiling is continued for a short time. The reaction takes the following course:

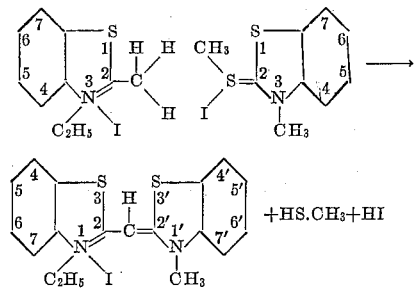

After cooling, the light-yellow dyestuff crystallizes and after recrystallization from methanol it is obtained in a completely pure state. The yield amounts to 20 grams (corresponding with 47.5 per cent of the theory).

The alcoholic solution of the dye has an absorption maximum at a wave length of about 415μμ.

EXAMPLE 2. — *[3 - ethyl - benzthiazole-(2)-]-[1-ethyl-quinoline-(2)]-methine-cyanine iodide*

When starting from 10 grams of 2-methyl-benzothiazole-ethiodide (more than 1 molecular proportion) and 10 grams N-ethyl-α-thio-ethiodide-quinolon (1 molecular proportion) there is obtained in the manner described in Example 1 a reddish yellow dyestuff. The reaction occurs according to the following formula:

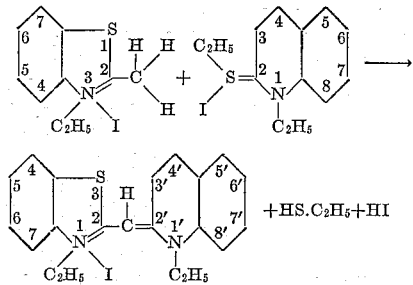

After re-crystallizing but once the yield of dyestuff amounts to 7 grams (corresponding with 52.5% of the theory).

Both dyestuffs are obtainable with an equally good yield, by using an alcoholic or an aqueous-alcoholic solution and adding thereto an amount of caustic alkali, piperidine or pyridine which slightly surpasses 1 molecular proportion of the respective substance.

The alcoholic solution of the dye has an absorption maximum at a wave length of about 492μμ.

EXAMPLE 3.—*bis-[3-ethyl - quinoline-(2)]-methinecyanine iodide*

10 grams of N-ethyl-α-thio-ethiodide-quinolon (1 molecular proportion) are slowly added to a boiling solution consisting of 10 grams of quinaldine-ethiodide (more than 1 molecular proportion) and 50 grams of pyridine. The reaction takes the following course:

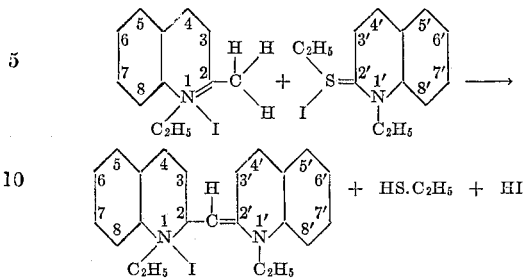

The dyestuff is precipitated from the cooled solution by means of water, then it is washed with ether and crystallized from methanol. The quantity obtained amounts to 30 per cent of the theory that is to 4 grams.

The alcoholic solution of the dye has an absorption maximum at a wave length of about 490μμ.

EXAMPLE 4. — *[1 - ethyl - quinoline-(2)-[3-ethyl-benzthiazole-(2)]-methinecyanine iodide*

2 grams of N-ethyl-2-nitrosoimidobenzothiazoline and 2 grams of quinaldine-ethiodide are separately dissolved each in 5 cc. of pyridine. After mixing the solutions there are added 2 or 3 drops of piperidine and the whole is kept gently boiling for about 1 hour under reflux. As soon as the development of nitrogen has ceased, the mixture is allowed to cool whereby the reddish yellow dyestuff crystallizes in part from the mother liquor. The reaction takes the following course:

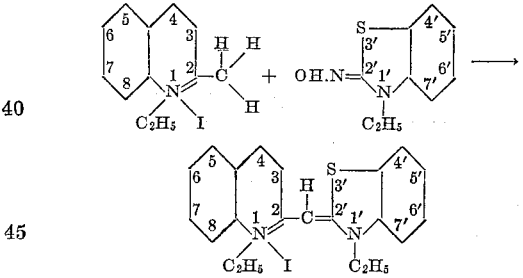

The mother liquor is then mixed with ether, whereby the rest of the dyestuff formed is precipitated. The yield amounts to about 30 to 35 per cent of the theory.

The alcoholic solution of the dye has an absorption maximum at a wave length of about 492μμ.

EXAMPLE 5. — *[3 - ethyl - benzthiazole-(2)]-[1-ethyl - 6 - methyl - quinoline - (2)]-α - methyl-methinecyanine, iodide corresponding with the following formula:*

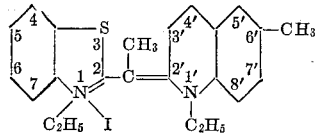

To a boiling solution of 2 grams of 2-ethyl-benzothiazole ethiodide and 2 grams of N-ethyl-para-tolu-α-thio-ethiodide-quinolon in 20 cc. of alcohol there are added 0.5 cc. of piperidine and heating is continued for another 10 minutes. From the solution turning intensely reddish-violet the dyestuff, on cooling is obtained in the form of orange needles.

The alcoholic solution of the dye has an absorption maximum at a wave length of about 495μμ.

EXAMPLE 6.— [3 - ethyl - benzthiazole -(2)]-[1-ethyl-quinoline-(2)]-methinecyanine iodide 2 grams of 2-methylbenzothiazole ethiodide (more than one molecular proportion) and 2 grams of N-ethyl-α-seleno-ethiodide-quinolon (one molecular proportion) are dissolved in 200 cc. of hot alcohol. To this mixture there are added drop by drop 2.5 cc. of piperidine. When cooling, the reddish yellow dyestuff is precipitated. The reaction takes the following course:

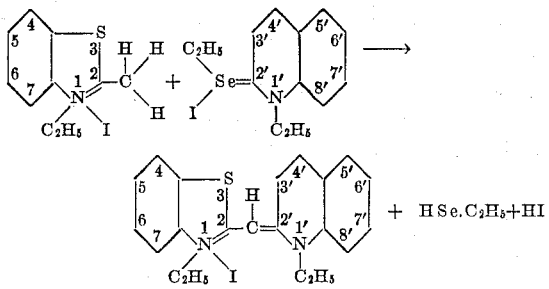

After re-crystallizing but once the yield amounts to about 7 grams.

The alcoholic solution of the dye has an absorption maximum at a wave length of about 492μμ.

EXAMPLE 7.—[3-ethyl-benzoxo-(2)]-[1-ethyl-6-methyl-quinoline-(2)]-methinecyanine iodide corresponding with the formula

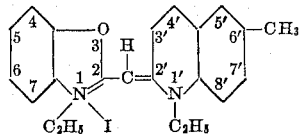

may be obtained by heating 30 grams (1/10 mol) of 2-methyl-benzoxazole ethiodide and 38 grams (1/10 mol) of N-ethyl-para-tolu-α-thio-ethiodide-quinolon are heated with 100 cc. of pyridine until boiling, whereby dissolution takes place. Now, there are added 10 cc. of piperidine drop by drop and after the addition heating is continued for 5 minutes. Then the mixture is cooled and the dye separates in form of a thick orange yellow crystalline mass (eventually after rubbing the wall of the vessel with a glass rod or after introduction of a crystal nucleus). The crystals are filtered and washed with alcohol and ether. After recrystallizing two times from alcohol the yield amounts to 19 grams of pure dyestuff from 25 grams of raw dyestuff.

The alcoholic solution of the dye has an absorption maximum at a wave length of about 460μμ.

EXAMPLE 8.— [3-ethyl - benzselenazole-(2)]-[1-ethyl - 6 - methyl-quinoline-(2)]-methinecyanine iodide corresponding with the formula

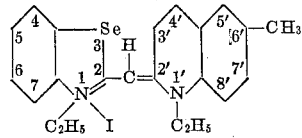

may be obtained by dissolving 100 grams of 2-methylbenzoselenazole ethiodide in 1 liter of alcohol while heating under reflux on the steam bath. Hereon there are added 110 grams of N-ethyl-para-tolu-α-thio-ethiodide-quinolon and after a short boiling and complete dissolution 40 cc. of piperidine are slowly entered. The dye is immediately precipitated as a thick crystalline mass. The mass is still heated on the steam bath for ½ hour, then it is cooled and the dye is filtered. After recrystallizing two times from alcohol the dye is pure.

The yield amounts to 85 grams of raw dyestuff and 75 grams of pure dyestuff.

The alcoholic solution of the dye has an absorption maximum at a wave length of about 500μμ.

EXAMPLE 9.— [1-ethyl-quinoline-(4)]-[1-ethyl-6 - methyl - quinoline - (2)] - methinecyanine iodide corresponding with the formula

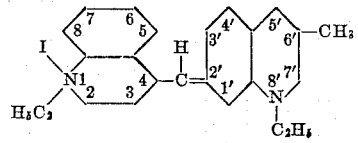

may be obtained by mixing 31 grams (1/10 mol) of lepidine ethiodide, 38 grams (1/10 mol) of N - ethyl - para-tolu-α-thio-quinolone ethiodide and 200 cc. of pyridine and boiling the mixture. Then there are added 10 cc. of piperidine and after boiling for 5 minutes the mixture is cooled and mixed with 100 cc. of dry ether. If the dye does not separate it will be precipitated on rubbing the wall of the vessel with a glass rod. The dye which has separated after 1 hour's standing is filtered and recrystallized two times from alcohol.

The yield is 24 grams of raw dyestuff and 20 grams of pure dyestuff.

The alcoholic solution of the dye has two absorption maxima at wave lengths of about 565μμ and 525μμ.

EXAMPLE 10.—[3-ethyl-anthracenethiazole-(2)]-[1- ethyl - 6 - methyl-quinoline-(2)]-methinecyanine iodide corresponding with the formula

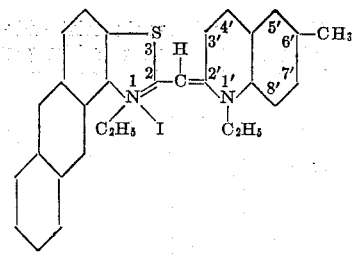

may be obtained by mixing 10 grams of N-ethyl-para-tolu-α-thio-ethiodide-quinolon, 10 grams of 2-methyl-β-anthrathiazole ethiodide and 75 cc. of pyridine and boiling the mixture. The condensation takes place immediately and is completed by the addition of 1 cc. of piperidine. Boiling is continued for 5 minutes and then the mixture is cooled. The greatest part of the red dye separates on cooling and is removed by filtration. From the pyridine solution there may be obtained a further small quantity of dyestuff by precipitation with ether. The dye is recrystallized from a large quantity of methanol and may be if required made into the more soluble nitrate by means of silver nitrate.

The yield of dyestuff amounts to about 22 per cent calculated on the 2-methylanthrathiazole ethiodide.

The alcoholic solution of the dye has an absorption maximum at a wave length of about 595μμ.

EXAMPLE 11.— [3-methyl-benzthiazole-(2)]-[1-ethyl - quinoline-(4)]-methinecyanine iodide ethiodide corresponding with the formula

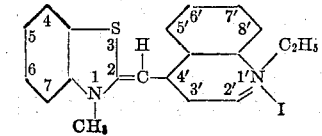

may be made by boiling a mixture of 14 grams of lepidine ethiodide and 35 cc. of pyridine and adding 10 grams of N-methylthiobenzothiazolonemethiodide in three portions. Boiling is continued for 1 minute and then there are added 10 drops of piperidine. After further boiling for 2 minutes the mixture is cooled and the greatest part of it crystallizes and is filtered. A further quantity of dye may be obtained on the addition of ether to the pyridine solution. The dye is recrystallized two times from alcohol.

The yield of raw product amounts to 35 per cent and the quantity of pure product amounts to 30 per cent of dye.

The alcoholic solution of the dye has an absorption maximum at a wave length of about 503μμ.

Our invention is not limited to the foregoing examples or to the specific details given therein and we contemplate as included within our invention all such modifications and equivalents as fall within the scope of the appended claims. Numbering of the bases serving as a starting material is commenced from the sulfur etc. atom of the 5 ring.

What we claim is:

1. The process which comprises boiling a salt consisting of an acid radicle and a radicle of the formula

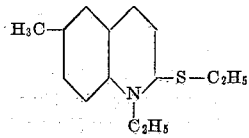

with 2-methylbenzoselenazole ethiodide in alcohol until dissolution occurs, adding piperidine to the boiling mixture and separating the formed dye.

2. The process which comprises boiling a salt consisting of an acid radicle and a radicle of the formula

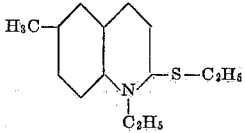

with a mixture of lepidine ethiodide and pyridine, adding piperidine and separating the formed dye.

3. A process for the preparation of a cyanine salt comprising condensing, in the presence of a basic condensing agent, a salt consisting of an acid radical and a radical of the following formula:

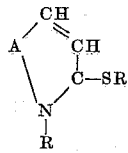

wherein A represents a phenylene group and R represent alkyl groups, with a cyclammonium alkyl quaternary salt containing a reactive methyl group and selected from the group of cyclammonium alkyl quaternary salts consisting of those of the quinoline series, the thiazole series and the oxazole series.

4. A process for the preparation of a cyanine salt comprising condensing, in the presence of a basic condensing agent, a salt consisting of an acid radical and a radical of the following formula:

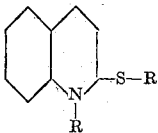

wherein R represents alkyl groups, with a cyclammonium alkyl quaternary salt of the quinoline series containing a reactive methyl group.

5. A process for the preparation of a cyanine salt comprising condensing, in the presence of a basic condensing agent, a salt consisting of an acid radical and a radical of the following formula:

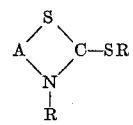

wherein A represents a phenylene group and R represents alkyl groups, with a cyclammonium alkyl quaternary salt of the thiazole series containing a reactive methyl group.

6. A process for the preparation of a cyanine salt comprising condensing, in the presence of a basic condensing agent, a salt consisting of an acid radical and a radical of the following formula:

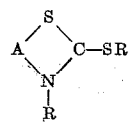

wherein A represents a phenylene group and R represents alkyl groups with a cyclammonium alkyl quaternary salt of the quinoline series containing a reactive methyl group.

7. The process which comprises reacting a nitrogenous heterocyclic compound of the type usual in cyanine dyes, carrying an alkyl substituent on the ring nitrogen and containing in α-position thereto a reactive grouping selected from the class consisting of —S—alkyl, —Se alkyl, =N—NO and =NC$_6$H$_5$, said compound containing an acid radical when said reactive group is one of said first two members of said class, with a cyclammonium alkyl quaternary salt of the type used in cyanine dyes and containing a reactive alkyl group on the heterocyclic ring.

8. The process which comprises reacting a salt consisting of an acid radical and a radical of the following formula:

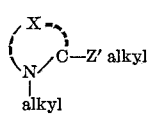

wherein X is the remainder of a heterocyclic system of the type used in cyanine dyes and Z' is a member of the class consisting of S and Se, with a cyclammonium alkyl quaternary salt of the type used in cyanine dyes and containing a reactive alkyl group on the heterocyclic ring.

9. The process as defined in claim 8 in which the reaction is effected in the presence of a basic condensing agent.

10. The process which comprises reacting a salt consisting of an acid radical and a radical of the following formula

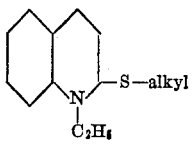

on a cyclammonium alkyl quaternary salt of the type used in cyanine dyes and containing a reactive methyl group on the heterocyclic ring.

11. The process as defined in claim 10 in which the reaction is effected in the presence of a basic condensing agent.

12. The process as defined in claim 10 wherein said cyclammonium quaternary salt is an N-alkyl-2-methyl-benzselenazole.

13. The process which comprises reacting a salt consisting of an acid radical and a radical of the formula

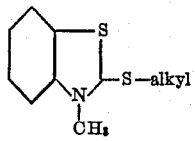

with a cyclammonium alkyl quaternary salt of the type used in cyanine dyes and containing a reactive methyl group on the heterocyclic ring, in the presence of an organic basic condensing agent.

14. The process as defined in claim 13, wherein said cyclammonium quaternary salt is an N-alkyl-4-methyl-quinoline.

ROBERT WALTER.
HERMANN DÜRR.